United States Patent
Caid et al.

(10) Patent No.: US 7,072,872 B2
(45) Date of Patent: Jul. 4, 2006

(54) REPRESENTATION AND RETRIEVAL OF IMAGES USING CONTEXT VECTORS DERIVED FROM IMAGE INFORMATION ELEMENTS

(75) Inventors: William R. Caid, San Diego, CA (US); Robert Hecht-Neilsen, Del Mar, CA (US)

(73) Assignee: Fair Isaac Corporation, San Diego, CA (US)

( * ) Notice: Subject to any disclaimer, the term of this patent is extended or adjusted under 35 U.S.C. 154(b) by 47 days.

(21) Appl. No.: 10/868,538

(22) Filed: Jun. 14, 2004

(65) Prior Publication Data

US 2004/0249774 A1 Dec. 9, 2004

Related U.S. Application Data

(63) Continuation of application No. 09/675,867, filed on Sep. 29, 2000, now Pat. No. 6,760,714, which is a continuation of application No. 08/931,927, filed on Sep. 17, 1997, now Pat. No. 6,173,275, which is a continuation of application No. 08/322,313, filed on Oct. 13, 1994, now abandoned, which is a continuation-in-part of application No. 08/124,098, filed on Sep. 20, 1993, now abandoned.

(51) Int. Cl.
*G06F 15/18* (2006.01)
(52) U.S. Cl. ........................................ 706/14
(58) Field of Classification Search .................. 706/14
See application file for complete search history.

(56) References Cited

U.S. PATENT DOCUMENTS 5,161,204 A * 11/1992 Hutcheson et al. ......... 382/157
5,325,298 A * 6/1994 Gallant ........................... 704/9
5,893,095 A * 4/1999 Jain et al. ....................... 707/6

OTHER PUBLICATIONS

A practical approach for representing context and for performing word sense disambiguation using neural networks Gallant, S.I.; Neural Networks, 1991., IJCNN-91-Seattle International Joint Conference on vol. ii, Jul. 8-14, 1991 pp. 1007 vol. 2.*

(Continued)

*Primary Examiner*—Anthony Knight
*Assistant Examiner*—Michael B. Holmes
(74) *Attorney, Agent, or Firm*—Michael A. Glenn; Glenn Patent Group

(57) ABSTRACT

Image features are generated by performing wavelet transformations at sample points on images stored in electronic form. Multiple wavelet transformations at a point are combined to form an image feature vector. A prototypical set of feature vectors, or atoms, is derived from the set of feature vectors to form an "atomic vocabulary." The prototypical feature vectors are derived using a vector quantization method, e.g., using neural network self-organization techniques, in which a vector quantization network is also generated. The atomic vocabulary is used to define new images. Meaning is established between atoms in the atomic vocabulary. High-dimensional context vectors are assigned to each atom. The context vectors are then trained as a function of the proximity and co-occurrence of each atom to other atoms in the image. After training, the context vectors associated with the atoms that comprise an image are combined to form a summary vector for the image. Images are retrieved using a number of query methods, e.g., images, image portions, vocabulary atoms, index terms. The user's query is converted into a query context vector. A dot product is calculated between the query vector and the summary vectors to locate images having the closest meaning. The invention is also applicable to video or temporally related images, and can also be used in conjunction with other context vector data domains such as text or audio, thereby linking images to such data domains.

9 Claims, 15 Drawing Sheets

OTHER PUBLICATIONS

DEPICT: Documents Evaluated as Pictures, Visualizing information using context vectors and self-organizing maps Rushall, D.A.; Ilgen, M.R.; Information Visualization '96, Proceedings IEEE Symposium on Oct. 28-29, 1996 pp. 100-107, 131.*

Improving the classification accuracy of automatic text processing systems using context vectors and back-propagation algorithmsFarkas, J.; Electrical and Computer Engineering, 1996. Canadian Conference on vol. 2, May 26-29, 1996 pp. 696-699 vol. 2.*

Recognition of musical tonality from sound input Izmirli, O.; Bilgen, S.; Electrotechnical Conference, 1994. Proceedings., 7th Mediterranean Apr. 12-14, 1994 pp. 269-271 vol. 1.*

A SIFT Descriptor with Global Context Mortensen, E.N.; Hongli Deng; Shapiro, L.; Computer Vision and Pattern Recognition, 2005. CVPR 2005. IEEE Computer Society Conference on vol. 1, Jun. 20-26, 2005 pp. 184-190.*

Speech recognition using dynamic transformation of phoneme templates depending on acoustic/phonetic environments Abe, Y.; Nakajima, K.; Acoustics, Speech, and Signal Processing, ICASSP-89., International Conference on May 1989 pp. 326-329 vol. 1.*

Kevin Gurney "An Introduction to Neural Networks" 1997, Chapter Three.*

* cited by examiner

REPRESENTATION AND RETRIEVAL OF IMAGES USING CONTEXT VECTORS DERIVED FROM IMAGE INFORMATION ELEMENTS

CROSS-REFERENCE TO RELATED APPLICATION

This application is a continuation of application Ser. No. 09/675,867, entitled "Representation and Retrieval of Images Using Context Vectors Dervied from Image Information Elements," filed Sep. 29, 2000 now U.S. Pat. No. 6,760,714, which is a continuation of application Ser. No. 08/931,927, entitled "Image Context Addressable Retrieval System," filed Sep. 17, 1997 now U.S. Pat. No. 6,173,275, which is a continuation of application Ser. No. 08/322,313 filed Oct. 13, 1994 now abandoned, which is a continuation-in-part of U.S. application Ser. No. 08/124,098 filed by Caid et al., on Sep. 20, 1993 now abandoned (hereinafter, Caid et al.), which was abandoned in favor of File Wrapper Continuation Ser. No. 08/561,167 now U.S. Pat. No. 5,619,709 for "System and Method of Context Vector Generation and Retrieval." The above applicaions are incorporated by reference in their entirety.

BACKGROUND OF THE INVENTION

1. Field of the Invention

This invention relates to storage, indexing, and retrieval of image data, and more particularly to a method and system for generating and retrieving context vectors that represent high-dimensional abstractions of information in images.

2. Description of Background Art

Analysis of image subject content is a time-consuming and costly operation. This analysis is often required for the identification of images of interest in existing image data bases and the routing and dissemination of images of interest in a real-time environment. The conventional approach is to rely upon human intellectual effort to analyze the content of images. It would be desirable to reliably translate image data into representations that would enable a computer to assess the relative proximity of meaning among images in a database.

Certain known document retrieval systems use variable length lists of terms as a representation, but without meaning sensitivity between terms. In such systems, pairs of terms are either synonyms or not synonyms.

So-called "vector space methods" can capture meaning sensitivity, but they require that the closeness of every pair of terms be known. A typical full-scale system with over 100,000 terms might require about 5 billion relationships—an impractical amount of information to obtain and store.

Methods have also been proposed for searching documents with fixed length vectors. However, such methods require work on the order of at least the square of the sum of the number of documents and the number of terms. This is impractical for a large corpus of documents, images, or terms.

A document retrieval model based on neural networks that captures some meaning sensitivity has been proposed. A neural network consists of a collection of cells and connections among cells, where every connection has an associated positive or negative number, called a weight or component value. Each cell employs a common rule to compute an output, which is then passed along connections to other cells. The particular connections and component values determine the behavior of the network when some specified "input" cells receive a set of values. A search in a document retrieval system employing a neural network requires multiplication for twice the product of the number of documents and the number of keywords for each of a plurality of cycles.

Other document retrieval methods use vector representations in a Euclidean space. The kernel or core used in this method comprises non-overlapping documents. This results in small dimensional vectors on the order of seven values. Vectors are generated from the core documents based upon whether or not a term appears in a document. As an alternative, the method starts with a kernel of terms which never co-occur.

It would be desirable to have a computing system that can derive accurate, efficient, and manageable representations of images for later recall, retrieval, and association.

SUMMARY OF THE INVENTION

The present invention is directed to a method and system for generating context vectors associated with images in an image storage and retrieval database system. A context vector is a fixed length series of component values or weights representative of meaning or content. Relationships among context vectors are representative of conceptual relationships among their associated items (e.g., information elements comprised in the image). Thus, two items having similar meaning or content have similarly-oriented context vectors, while items having dissimilar meaning or content have roughly orthogonal context vectors. Similarity between items is measured by calculating the dot product of the associated context vectors.

Context vectors may be associated with words, terms, documents, document portions, queries, quantitative data, or any other type of information element. In the present invention, context vectors are associated with information elements, or features, derived by performing wavelet transformations at a plurality of points on each electronically stored image in the database. The transformations provide orientation-sensitive spatial frequencies on the images at a variety of orientation/frequency combinations. These features are combined to form image feature vectors or "image vocabulary" elements analogous to words in text.

A prototypical subset of feature vectors, or atoms (also called information elements), are derived from the set of feature vectors to form an "atomic vocabulary." In one embodiment, the prototypical feature vectors are derived by using a vector quantization method, e.g., self organization, in which a vector quantization network is also generated.

The atomic vocabulary is used to define images in the database or any new image in electronic computer-readable form. As above, a wavelet transformation is performed at a plurality of sample points on the image to generate feature vectors representing the image. The generated feature vectors are mapped to the closest atoms in the atomic vocabulary using the vector quantization network. Thus, new images are defined in terms of the established atomic vocabulary.

In one embodiment, a "stop list" of high-frequency, low-information, feature vectors is also generated. The stop list can be used to remove high-frequency, low-information, feature vectors when using the atomic vocabulary to represent images.

In order to quantify conceptual relationships among atoms in the atomic vocabulary (and the images they variously represent), context vectors are employed. A context vector is associated with each atom in the atomic vocabulary. A learning law is applied to modify the context vectors as a function of the proximity of the atom to other atoms in the image and the frequency of occurrence of the atom in the image database.

Once the context vectors are established, the context vectors associated with the atoms that define an image are combined to form a summary vector for the image. The summary vector represents the overall meaning or content of the image.

In one embodiment, summary vectors of images are stored in clusters to reduce searching time. Images with similar information content occupy the same cluster. In one embodiment, textual index terms are associated with images in the database, and are automatically assigned to new images. Thus, textual queries can be used to retrieve images.

Images are retrieved using any of a number of query methods, e.g., images, image portions, vocabulary atoms, index terms. The query is converted into a query context vector. A dot product calculation is performed between the query vector and the summary vectors to locate the images having the closest vectors. Retrieved images are displayed in order of vector proximity, which corresponds to relative relevance to the query. In one embodiment, retrieved images are broken into sub-portions and the most relevant portions matching the query vector are highlighted in the image.

DESCRIPTION OF THE PREFERRED EMBODIMENTS

Figure 1:
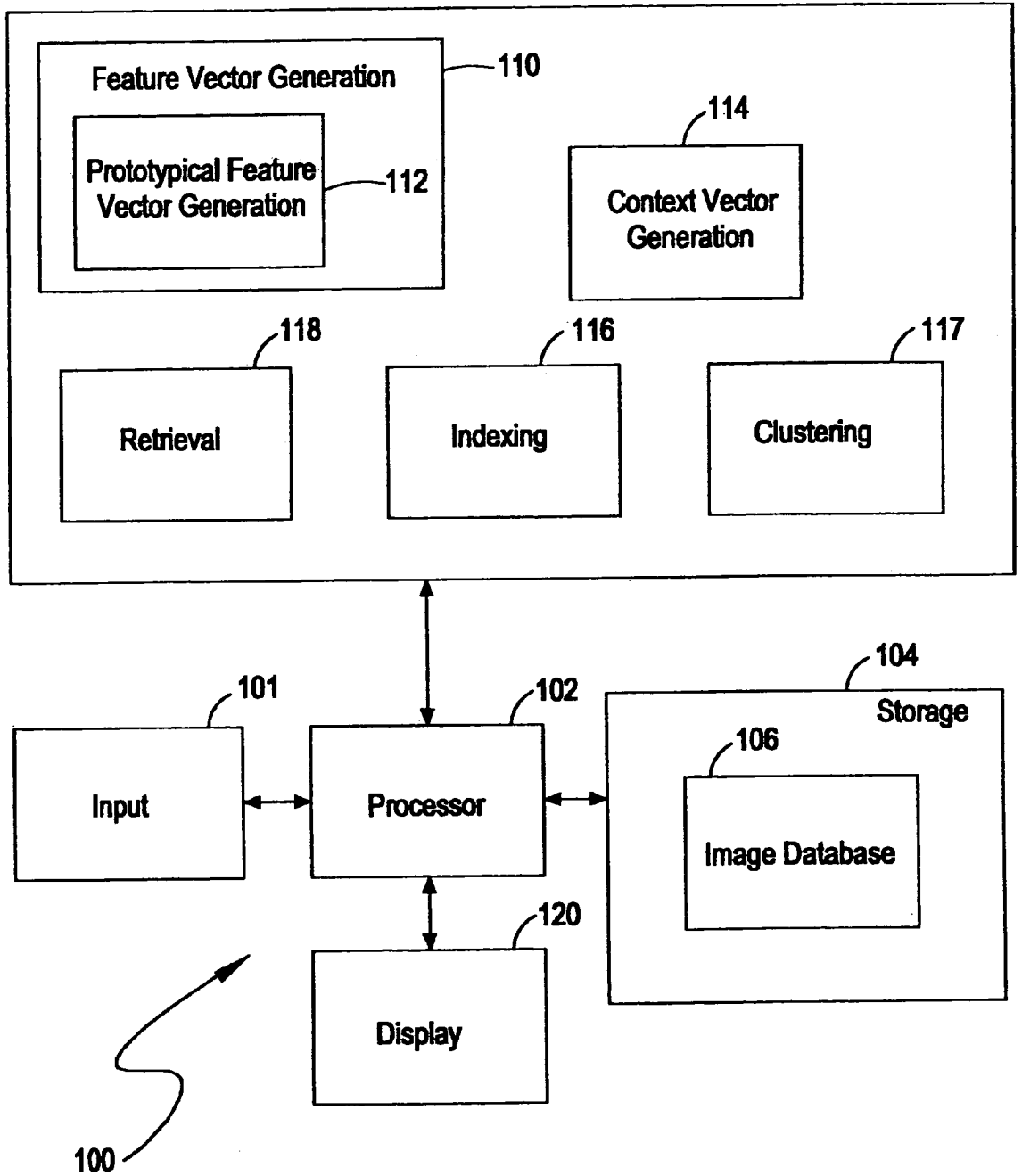
FIG. 1 is a simplified block diagram of a computer hardware and software implementation of the present invention.

FIG. 1 shows a block diagram of software and hardware components for implementing one embodiment of the present invention 100. Processor 102 is a conventional engineering workstation or other computer processor and may also be coupled to other processors accessible over conventional communications channels or buses (not shown). Processor 102 is conventionally coupled to storage 104 which may be a magnetic disk storage, a CD storage unit, or other conventional computer data storage unit. Storage 104 may also be coupled to other storage units accessible over conventional communications channels or buses (not shown). Storage 104 includes image database 106. Image database 106 contains images in electronic or computer-readable form. Images may be discreet images, video, or temporally related images, e.g., motion picture frames.

Processor 102 is also conventionally coupled to memory 108 which is a random access memory (RAM) unit or other conventional computer memory. Items in memory 108 may alternatively be stored in storage 104 and accessed by processor 102 when required. Memory 108 may comprise feature vector generation 110, prototypical feature vector generation 112, iterative training or context vector generation 114, indexing 116, clustering 117, and retrieval 118 program components or modules as discussed below. Input 101 comprises conventional input devices such as a keyboard, mouse, trac ball, or touchscreen. A conventional display unit 120 may also be conventionally coupled to processor 102.

The preferred embodiment of the present invention may be implemented on any platform, operating system, and user interface of sufficient power and flexibility, such as: XWindows/MOTIF; Sun/OS SunView; Microsoft Windows, VAX/VMS, and the like, and may be operated in a distributed data/distributed processor environment, if desired. In the preferred embodiment, the invention is capable of handling a very large data corpus, e.g., containing over 10 million images.

The present invention is based upon an image representation scheme using context vectors. Context vectors are used to identify images of interest in existing image data bases and/or the routing and dissemination of images of interest in a real-time environment. A context vector is a fixed-length vector having a plurality of component values or weights that are determined based on relationships between meanings of information items or elements. In the present invention, context vectors represent the relative meaning among, or content of, information elements (described below) that are used to define images. The meaning is derived from geometric (e.g., proximity and co-occurrence of information elements in images) and quantitative statistics, data, and analysis (e.g., frequency of occurrence of information elements in the image database). Images-are defined using information elements. Context vectors associated with each information element in an image are combined to form a summary vector. Similar images have closely aligned summary vectors, while dissimilar images have roughly orthogonal summary vectors. This representation scheme allows quantification of the similarity of images to be assessed by performing a simple dot product operation on the associated summary vectors, wherein a high dot product indicates a similar meaning.

Note, the absolute orientation of a particular context or summary vector in the vector-space is irrelevant, as long as the relative orientation (with respect to other vectors) is representative of relative proximity of meaning and content. In other words, the problem of finding a set of vectors defining relative meaning has an infinite number of physical solutions in vector-space (absolute orientations) but only one logical solution (relative orientations). The context vector and summary vector generation scheme of the present invention produces a logical solution without regard to the absolute orientation of the vectors.

Context vectors may be associated with words, terms, documents, document portions, queries, quantitative data, or any other type of information item or element. Many techniques for text-based context vector generation are applicable to image processing as well. See, e.g., Caid et al.

For image processing, context vectors are associated with certain image feature vectors. Elements in the feature vector, called features, are derived using affine wavelet transformations on sample points in images in the image database. Features are combined to form a feature vector. Such feature vectors provide an "image vocabulary" analogous to words in text. Due to the large number of possible feature vectors, a set of prototypical feature vectors, or atoms (or image information elements), are derived to form an "atomic vocabulary." Random high-dimensional context vectors are assigned to each atom. The context vectors are then modified according to the spatial relationship and co-occurrence of the atoms in the images in a procedure called bootstrapping. Compensation for frequency of occurrence of each atom in the database of images can also be made context vectors for each image are generated by combining the context vectors associated with the atoms that comprise the image.

Context Vector Generation

Figure 2:
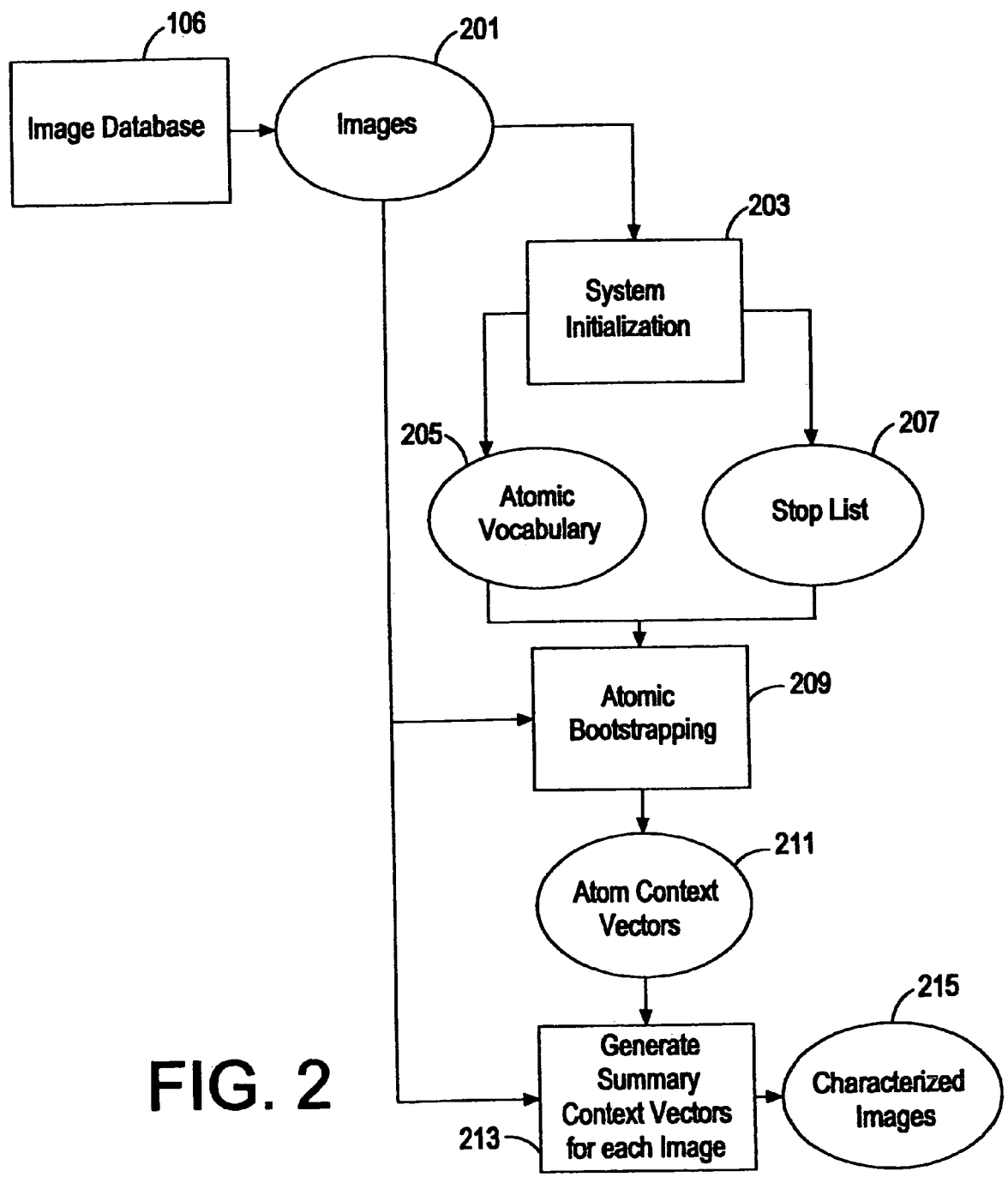
FIG. 2 is a high level flowchart of the present invention.

Referring now to FIG. 2, there is shown a high-level flowchart of the present invention. A corpus of images in image database 106 provides input of images 201 in electronic form to the system. The system is initialized 203 to generate atomic vocabulary 205 and stop list 207. Atomic bootstrapping 209 is then employed to produce context vectors 211 associated with each atom in the vocabulary. Context vectors 211 are used to generate 213 summary context vectors for each image 215. This method is described in more detail below.

Atomic Vocabulary Generation

Figure 3:
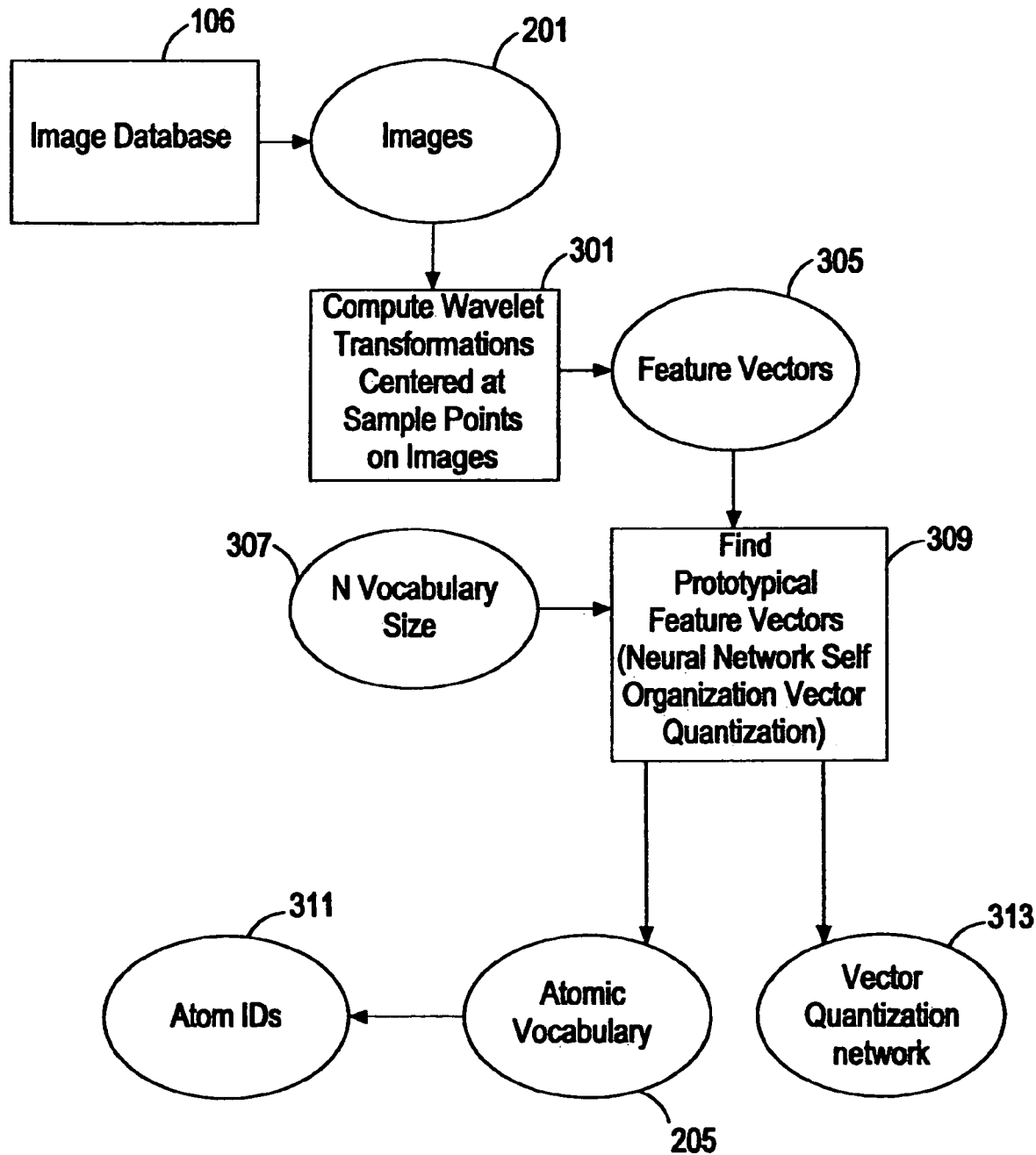
FIG. 3 is a flowchart of one embodiment of the method for generating an atomic vocabulary.

Referring now to FIG. 3, there is shown a flowchart of the process of generating atomic vocabulary 205 according to the present invention. Atomic vocabulary 205 is generated by using a combination of wavelet transformations, self-organization, and conventional statistics as described below. Image features, for example, primitive shapes, textures, or other similar attributes can be identified by wavelet transformations. These features are generally in a specific spatial orientation to one another in the image. The features, their number, characteristics, and spatial orientations form the context and content information of the image. Thus, features in images are analogous to words in a document. Images can include any number of individual features in any combination. The information content of an image is defined in terms of specific features in a specific spatial orientation and position. When combined in the correct sequence and in the correct spatial positions, the features define the image.

For each image 201 in image database 106, at least one wavelet transformation 301 is made of the image. Wavelets and wavelet transformations 301 are commonly known and are used to provide an efficient approach to localized characterization of information contained within images (see, for example, O. Rioul and M. Vetterli, "Wavelets and Signal Processing", IEEE SP MAGAZINE, October 1991; and, F. Hlawatsch and G. F. Boudreaux-Bartels, "Linear and Quadratic Time-Frequency Signal Representations", IEEE SP MAGAZINE, April 1992). In particular, the Gabor wavelet transformation provides a robust representation scheme of features that are sensitive to orientation and localized spatial frequency content. Thus, Gabor wavelets provide a mechanism for characterizing the information content of images in a compact and efficient fashion.

In the present invention, multiple wavelet transformations centered at "sample points" on the image 201 are made 301. To implement this process, Gabor wavelet parameters are selected to capture orientation-sensitive spatial frequencies at a variety of orientation/frequency combinations over the range of interest. Both sine and cosine wavelets are used to provide phase discrimination. For example, a combination of eight orientations, five spatial frequencies, and both sine and cosine (even and odd order) phases can be used. Thus, a total of 8*5*2, or 80 wavelets are associated with each sample point on the image 201. The actual number of combinations for a particular application is determined empirically based on the detail and accuracy of image representation required and processing capabilities. Due to the high level of processing power required during wavelet transformation, the preferred embodiment can employ, for example, the Vision Processor (ViP) chip set to perform high-speed image processing operations. The ViP chip set is available commercially from HNC, Inc., San Diego, Calif., as a plug-in circuit board for workstations manufactured by Sun Microsystems, for example.

A simple uniform grid-point approach can be used to determine the "sample points" on the image where the wavelet transformations are centered. Alternatively, more elaborate conventional "fixation control" techniques to determine "points of interest" within images can be used (see, for example, Abbot, Lynn, "A Survey of Selective Fixation Control for Machine Vision" IEEE Control Systems, August 1992). The accuracy of the image representation is linked to both the number of points sampled and the discrimination of the wavelet transformations employed (i.e., the number of coefficients computed at each sample point). In the example above, 80 real values are associated with each sample point. These values comprise a "feature vector" 305. Atoms in an atomic vocabulary 205 are formed from a subset of the feature vectors 305 in the manner described below.

The result of the wavelet transformations 301 and feature vector generation for each sample point on each image can result in an extremely large number of unique feature vectors 305. For example, using only a binary representation for the wavelet transformation values could result in $2^{80}$ ($10^{24}$) unique atoms. Accordingly, the present invention recognizes that a small fraction of the feature vectors 305 can sufficiently represent the images in the image-corpus. Thus, the set of generated features vectors can be reduced to a smaller number of prototypical feature vectors using statistical and neural network techniques.

In one embodiment, a vocabulary size, N, is chosen which defines the problem size 307. A reasonable range for N has been found to be between 104 and 106. The exact vocabulary size is empirically determined based on processing power available, the level of detail required for image definition, and the size and diversity of image database 106, for example. Statistical prototype feature vectors are selected using neural network self-organization techniques 309. Basically, the best N feature vectors 305 that represent the entire population of vectors are chosen by using a vector quantization (VQ) training operation. In the present invention, the VQ "learns" statistically representative exemplars given a population of feature vectors 305. Conventional VQ training techniques 309 such as extensions to clustering techniques (such as the widely used K-means algorithm) or variations on self-organizing approaches ("Self Organization and Associate Memory" by Tuevo Kohonen, 2nd Ed, Springer Verlag, 1988 P. 199–209) can be used to transform a potentially infinite number of examples into a finite (but possibly large) atomic vocabulary of statistically representative examples 205. See also Caid et al, which describes a singular value decomposition (SVD) method for reducing the vector space.

The prototypical feature vectors form atoms or information elements in the atomic vocabulary 205. Each atomic vocabulary item 205 is given a unique atom ID 311. As described below, each atom ID 311 so defined is then associated with a high-dimensional context vector to discern the proximal meaning between such atoms. The resulting VQ network is also saved 313.

In one embodiment, further statistics of the entire set of feature vectors 305 are determined to generate a "stop list." As in textual applications, images have a significant number of high frequency-of-occurrence atoms that convey little, if any, information. In the textual application analogy, words like "a", "an", "but", and "the", are put on a "stop list" and not used to defined the textual document. Similarly, statistics can be used to define high-occurrence, low informational atoms in images.

Figure 4:
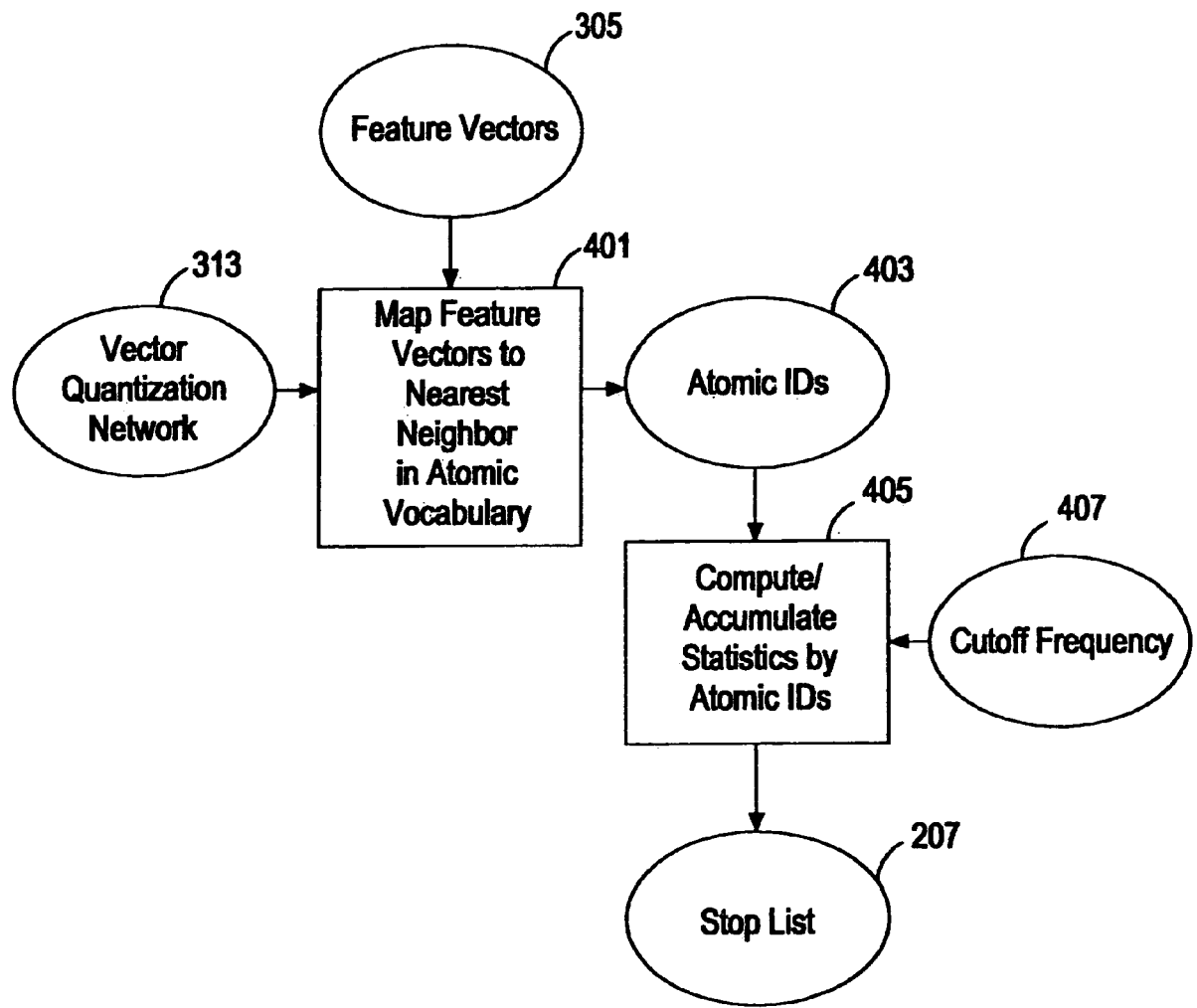
FIG. 4 is a flowchart of one embodiment of the method for generating a "stop list;"

Referring now to FIG. 4, there is shown a flowchart of the process of generating stop list 207 according to the present invention. Feature vectors 305 are fed through the previously saved VQ network 313 and are thus quantified or mapped 401 to the nearest-neighbor equivalent atomic vocabulary vector 205. Atomic IDs 311 associated with the mapped atomic vocabulary vector 205 are thus generated 403. Frequency-of-occurrence statistics are computed and accumulated 405 for the atomic IDs 403. Atomic ID's 403 having a frequency exceeding a cutoff 407 are placed on "stop list" 207. The cut-off frequency value 407 can be empirically determined based on the image database subject matter and level of image representation detail required, for example. Stop list 207 is used to eliminate low information atoms in when representing images using the atomic vocabulary 205, 311.

Image Characterization and Representation

Figure 5:
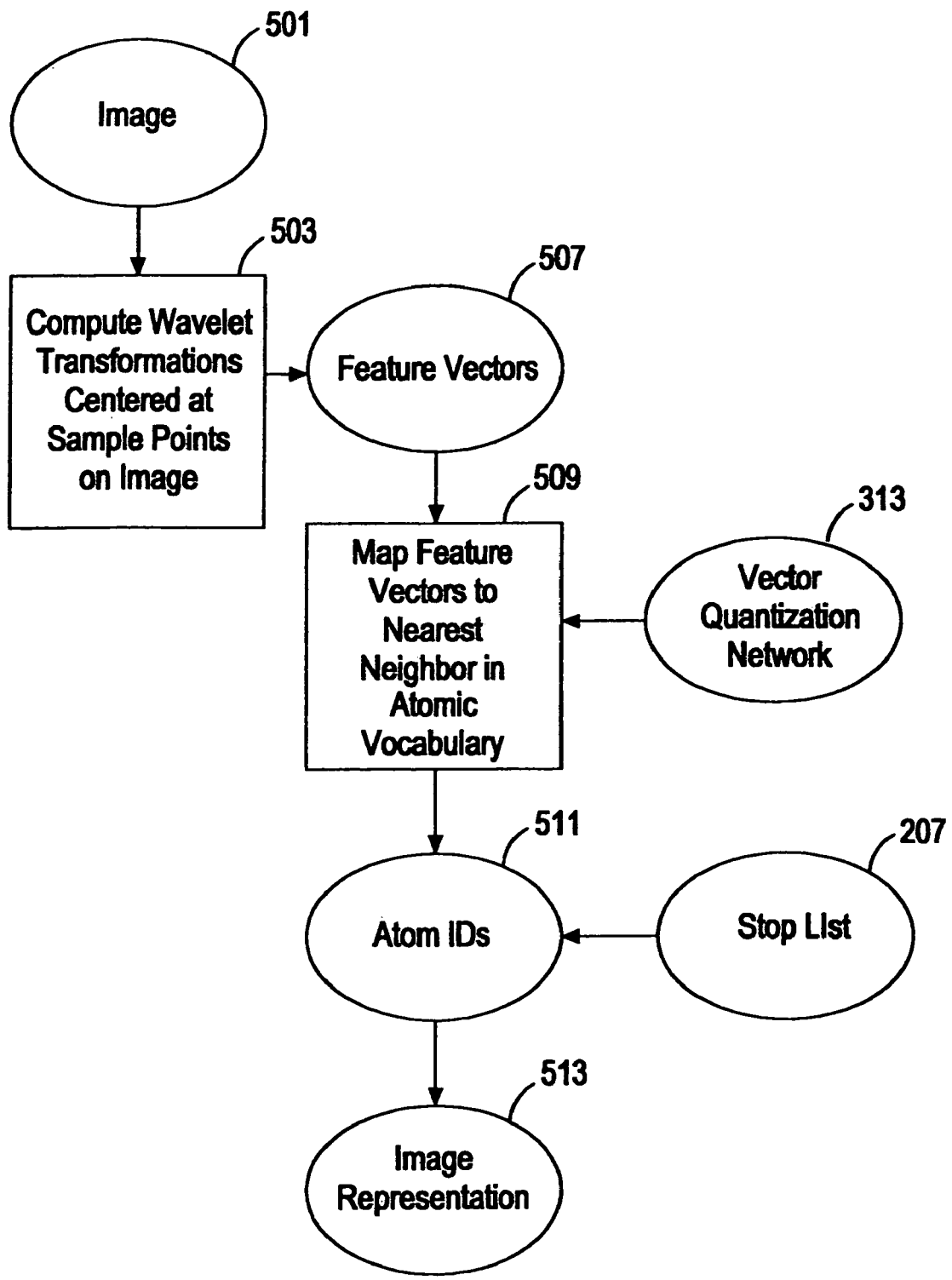
FIG. 5 is a flowchart of one embodiment of the method for representing a new image using the atomic vocabulary.

Any image may be represented in terms of the unique set of information elements in the atomic vocabulary 205, 311. Referring now to FIG. 5, there is shown a flowchart of a method for representing a new image using atomic vocabulary 205. As discussed above in association with feature vector generation (see, 301, 305), feature vectors for a new image 501 are generated by performing a plurality of wavelet transformations at a plurality of sample points 503 to generate a feature vector 507 at each sample point in the new image 501. As in the example above, each feature vector 507 may comprise a vector of 80 real values.

The previously saved VQ network 313 is used to map 509 each feature vector 507 to the nearest-neighbor equivalent atomic vocabulary vector 205. This provides a good approximation of the original image 501 and constrains the number of possible combinations of feature vectors 507 used to represent the image 501. Atom IDs associated with each mapped atomic vocabulary vector 205 are thus generated 511. Atoms IDs 511 contained in stop list 207 are removed as they add little information. Thus, an unlabeled, unconstrained image in electronic form 501 is transformed into an image representation 513 comprising atoms 511 from atomic vocabulary 205, 311.

The atomic representation 513 of image 501 provides a significant data compression over conventional image representation schemes. In fact, since the atom vocabulary 205 is relatively rich, the atomic representation 513 can often substitute for the original electronic image representation 501 for many purposes. An image can thus be represented by a set of codes 511, as defined by the atomic vocabulary 205, together with an indication of the location to each atom in the image (e.g., locations taken from the sampling grid used).

Context Vector Generation (Bootstrapping)

The context and relationship of atoms 511 in an image and in the entire image database 106 is learned from examples. This learning procedure is referred to as "bootstrapping," and is basically a type of self organization. The bootstrapping procedure is based on the concept of atom spatial and co-occurrence relationships. That is, atoms that appear in proximity to one another in a significant number of images are conceptually related (just as are words that appear in proximity to one another in a significant number of documents are conceptually related). The closer the atoms are, the stronger the relationship between them. Additionally, the relative importance of the atoms (and their influence on neighbors) is related to both the local frequency (within an image) and the global frequency (within the corpus of images). The specific technique for implementing these relationships is described below.

Figure 6:
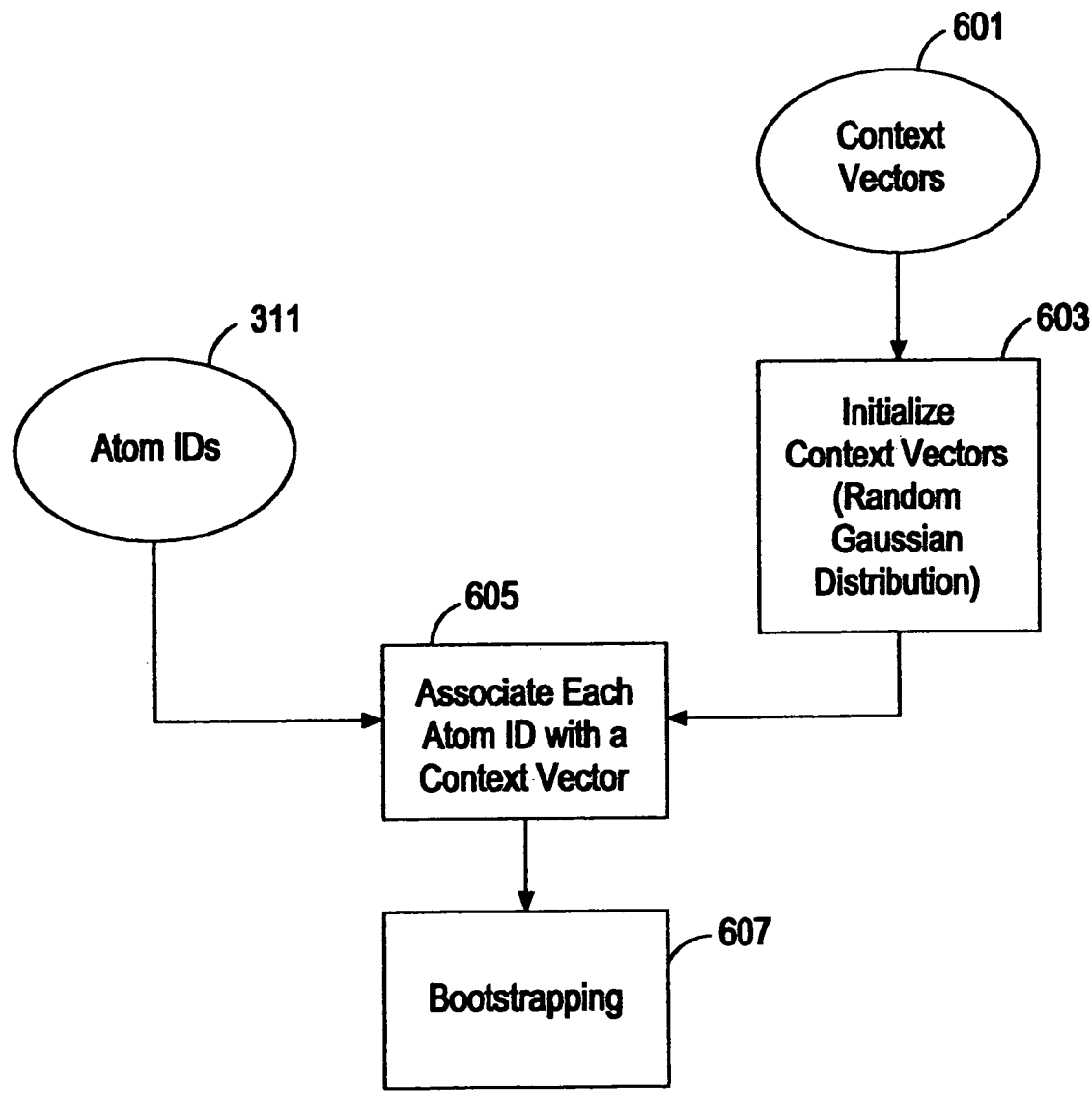
FIG. 6 is a flowchart of the method for initializing context vectors.

Referring now to FIG. 6, a method for initializing the system before bootstrapping is shown. According to the present invention, each atom ID 311 (corresponding to atoms in atomic vocabulary 205) is associated 605 with a high-dimensional context vector 601. A high dimensional vector space is advantageous in that 1) initial values for each vector can be generated by using a random Gaussian distribution which results in nearly orthogonal vectors (indicating no initial relationship between context vectors); 2) the information capacity of the vector space is very large when real valued vectors are used; and, 3) vector superposition allows summation of independent vectors into a single vector and later recovery of independent vectors via dot product. Initial values of each element in the context vectors 601 are randomly generated by using a random Gaussian distribution 603. This results in nearly orthogonal vectors indicating no initial relationship between context vectors. Each atom ID 311 is randomly associated 605 with an initialized context vector 603.

Atomic bootstrapping 607 is then performed by a constrained optimization technique where an objective function contains terms for local atom relationships, as well as global terms to insure that the statistics of the entire vector set remains well-behaved. In the preferred embodiment, a commercially available SIMD Neurocomputer Array Processor (SNAP) is used as a hardware accelerator due to the compute-intensive nature of the learning operation. The SNAP hardware accelerator is available commercially from HNC, Inc., San Diego, Calif.

Figure 7:
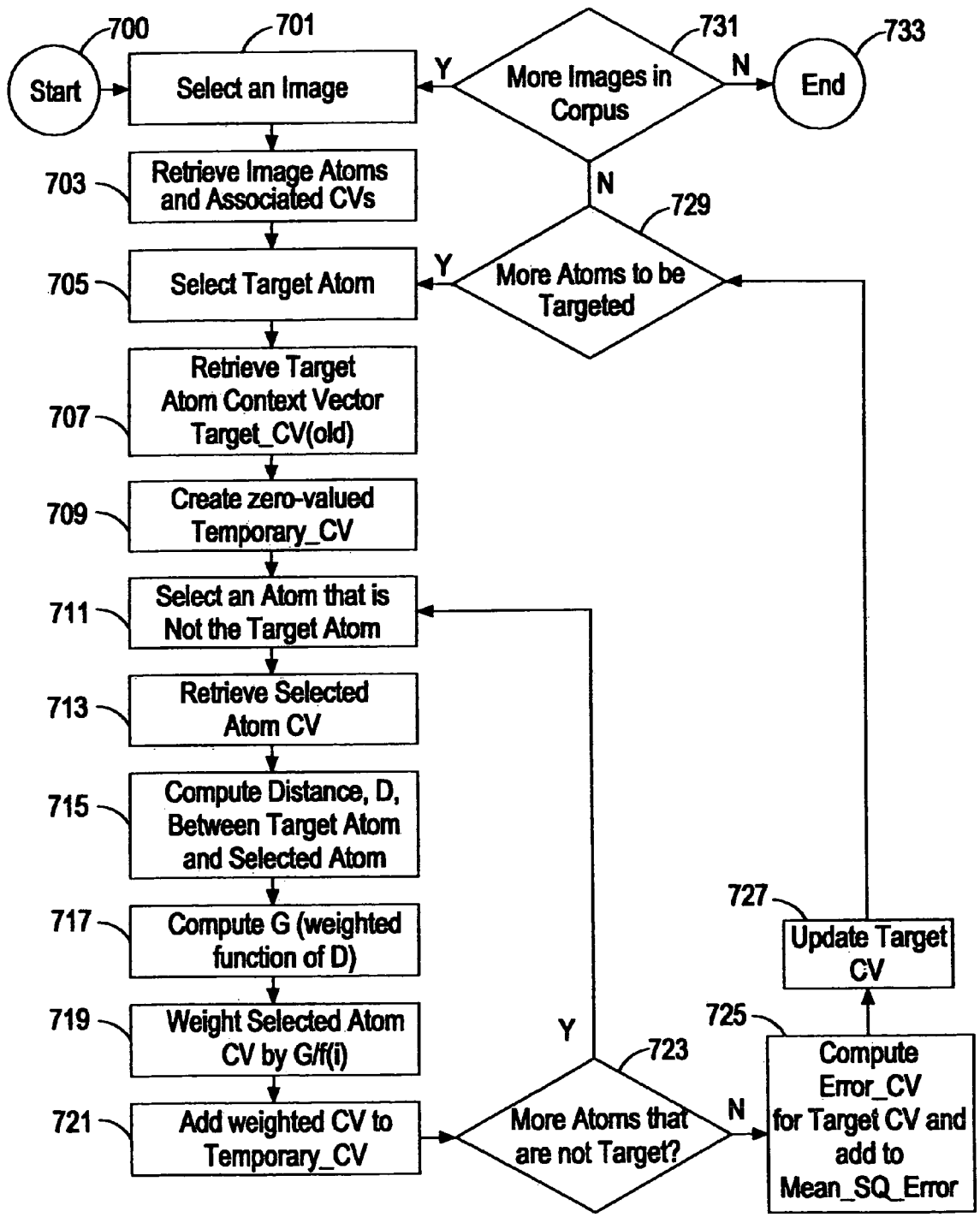
FIG. 7 is a flowchart of one embodiment of the bootstrapping procedure.

Referring now to FIG. 7, there is shown a flowchart of one embodiment of the bootstrapping procedure 607. Alternative embodiments that are optimized for processing speed may also be employed. In general, the bootstrapping procedure allows all atoms 511 within an image 501 to influence each other to varying degrees depending on proximity, and co-occurrence. The intra-image influence between atoms 511 is distance-weighted according to a Gaussian distribution in that atoms that appear close together in an image are given higher weight. In the preferred embodiment, all atoms 511 influence all other atoms within a single image, although this is not necessary. Alternatively, the influence could be limited to atoms within a certain "radius" of the target atom. This approach is similar to a Parzan window approach that performs non-parametric estimation of probability density based on superposition of Gaussian weighted samples. See, e.g., Parzan, E. "On Estimation of a Probability Density Function," Annals of Mathematical Statistics 33, 1065–1076, September 1962 and Rosenblatt, M. "Remarks On Some Nonparametric Estimates Of A Density Function," Annals of Mathematical Statistics, 27, 832–837, 1956. The vector co-occurrence of atoms 511 is learned in proportion to their mutual spatial co-occurrence frequencies across all images 201 in image database 106.

The following procedure is performed during each learning pass. Multiple learning passes through the corpus or database of images are generally required. First 700, the system selects 701 an image 501. Typically, images are selected sequentially, starting with the first image and proceeding through the last image. However, the learning approach makes no assumptions concerning the order of presentation of the images. For the selected image 701, the atoms 511; and associated context vectors (CVs) 605, that comprise the image are retrieved 703. In one embodiment, an image data structure contains a pointer to the linked list of atoms 511 that represent the image 501, and their associated context vectors 605.

An atom 511 of the selected image is targeted 705. Typically, atoms are targeted sequentially, but this is not necessary. The associated context vector for the target atom (Target_CV(old)) is retrieved 707. A zero-valued temporary context vector for local summation (Temporary_CV) is also created 709.

Figure 8:
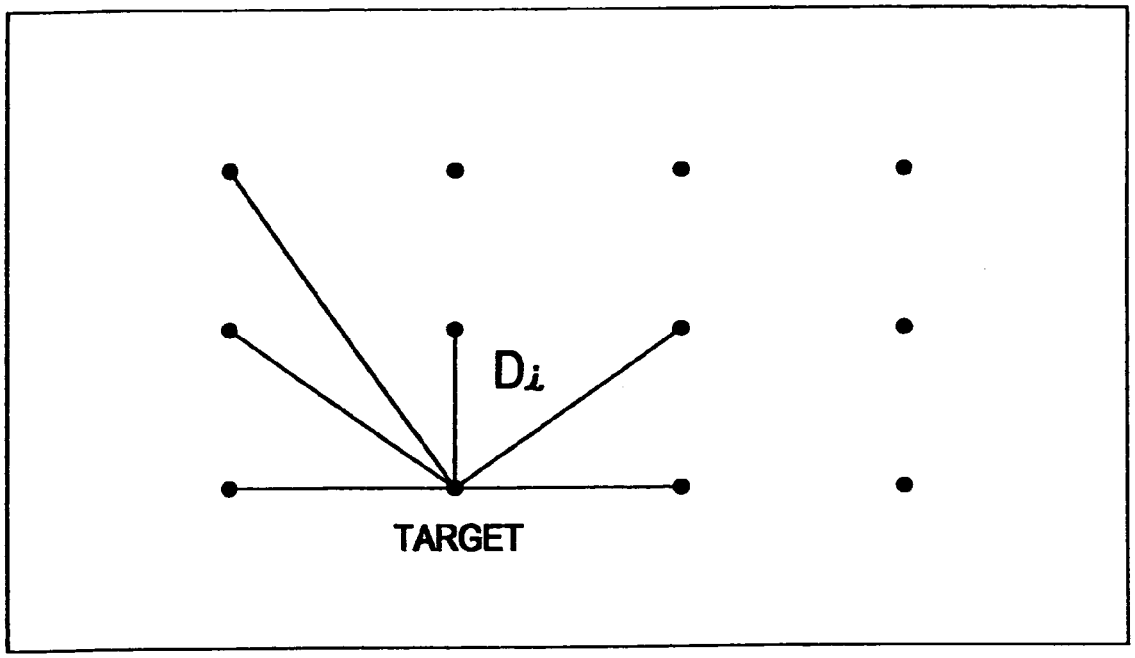
FIG. 8 is a pictorial representation of FIG. 7.

Each atom 511 in the image 501 that is not the target atom 705 is selected 711 in turn, and the associated context vector of the selected atom is retrieved 713. Alternatively, each atom in a defined "learning region" or "radius" around the target atom 705 can be used (instead of all atoms in the image), for example, all atoms within 2 sample points from the target atom 705. The physical Euclidean distance, D (a scalar), between the target atom 707 sample point and the selected atom 713 sample point is computed 715 (e.g., points and distances defined in sample point grid). This distance is pictorially shown in FIG. 8. The weighted function, G, of D is computed 717 as:

$$G = e^{-D/\sigma} \qquad \text{(Eq. 1)}$$

where □ is the standard deviation of a Gaussian distribution used in the proximity weighting function. The context vector of the selected atom 713 is weighted 719 by G and inversely by the frequency of occurrence of the selected atom 511 in the image 501 (an indicator of importance), $f_i$. Alternatively $f_i$ is the frequency of occurrence of atom 511 in the entire image database 106. The weighted context vector is added 721 to the temporary context vector 709.

The steps 711 through 721 are repeated 723 for each atom in the image that is not the target atom 705. Once all atoms 711 have been selected 723 (other than target atom 705), the system computes 725 an error vector (Error_CV) for the target context vector 707, according to the equation:

$$\text{Error\_}CV = \text{Temporary\_}CV - \text{Target\_}CV(\text{old}). \qquad \text{(Eq. 2)}$$

Error_CV may also be frequency weighted in proportion to the frequency of occurrence of the targeted atom in the corpus. Error_CV is squared and added to a variable Mean_SQ_Error 725 to keep track of the total mean squared error metric for the image corpus.

The system then updates Target CV 727 according to the equation:

$$\text{Target\_}CV(\text{new}) = \text{Target\_}CV(\text{old}) + \alpha * \text{Error\_}CV \qquad \text{(Eq. 3)}$$

where α is a predefined proximity constraint or step size that limits the correcting effect of Error_CV. The variable α is empirically determined based on variances in the image database and a desired learning rate, for example. Additionally, constraints may be added to prevent the target atom from "collapsing in" on the selected atoms. See, for example, Caid et al.

If there are atoms 511 that have not been targeted remaining in the selected image 729, the system returns to step 705. If not, it checks 731 whether there are more images in the corpus. If so, it returns to step 701; if not, the learning pass ends 733. The learning pass may be repeated multiple times. Generally, the process in FIG. 7 is repeated until the rate of change of Mean_SQ_Error 725 is arbitrarily small (i.e., the system is not learning anything new). The cutoff value of Mean_SQ_Error is determined empirically based on variances in the image database and accuracy required. Once the context vectors 727 are iteratively determined, they are saved in storage 104.

The procedure of FIG. 7 is expressed mathematically by the equation:

$$CV_{target}^{new} = CV_{target}^{old} + \sum_{i \neq target} \frac{1}{f_i} G(\|CV_{target}^{old} - CV_i\|) \cdot CV_i \qquad \text{(Eq. 4)}$$

where $CV_i$ is the selected context vector and $f_i$ is the frequency of occurrence of atom i in the image (or alternatively the entire image database), and G( ) is Gaussian weighting $e^{-D/\sigma}$.

Summary Vector Generation

Figure 9:
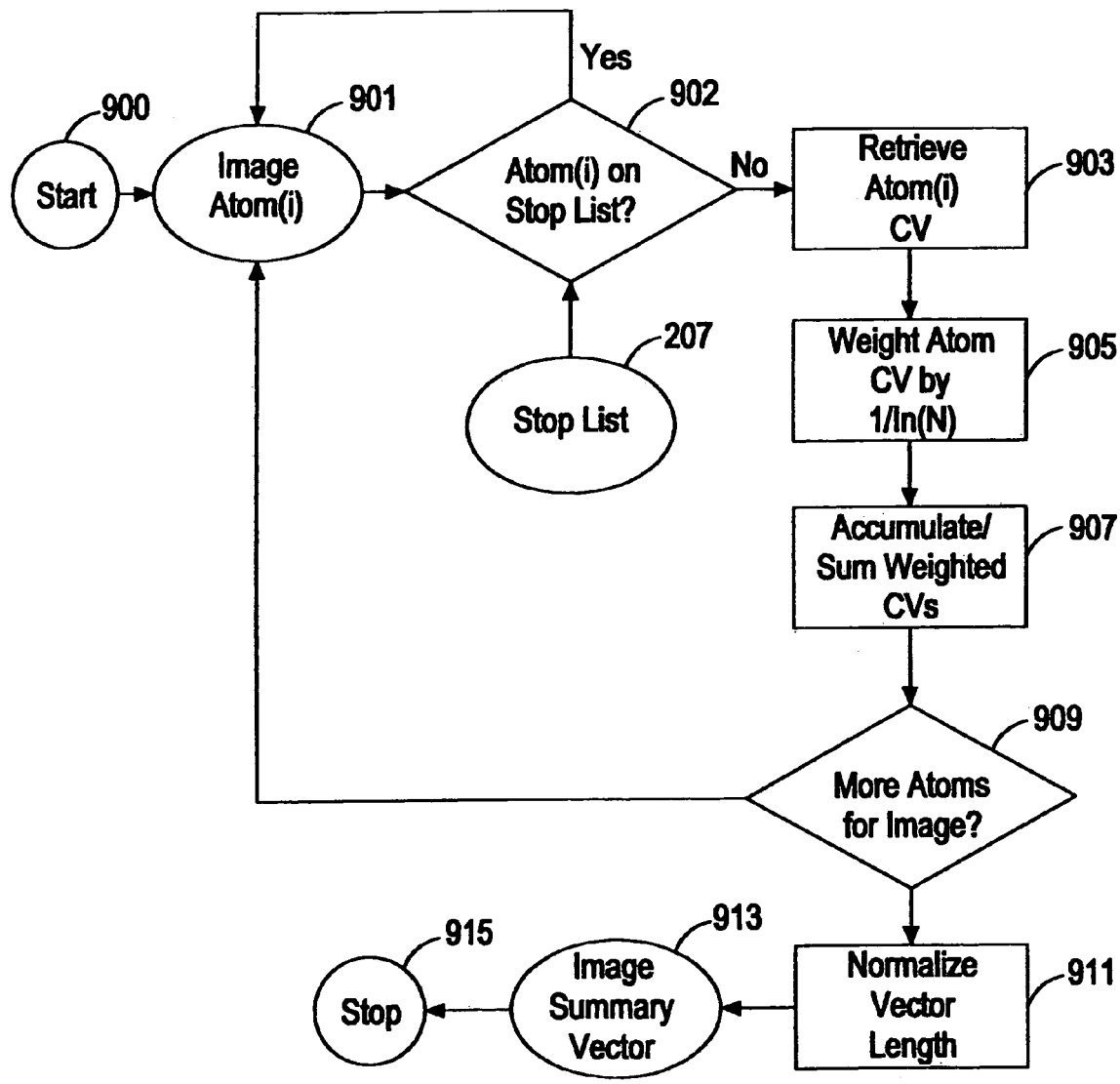
FIG. 9 is a flowchart of one embodiment of the method for generating a summary vector for an image.

Context vectors 727 associated with the atoms 511 that comprise an image 501 are combined to form summary vectors for images. Referring now to FIG. 9, there is shown a flowchart of the steps that are performed for each atom 511 in the image 501, in order to generate a summary vector for the image 501. First, 900, for each atom 901 in the image 501, a check is made to determine 902 if atom 901 is on stop list 207. If atom 901 is on stop list 207, the next atom is processed 901; if not, the associated context vector 727 is retrieved 903. Context vector 727 is weighted 905 by the function I/In(N) where N is the frequency of occurrence of atom 901 in image database 106, 201 (alternatively, N is the number of images 201 that contain atom 901). Weighted context vector 905 is accumulated and summed 907. After all atoms 901 for image 501 have been processed 909, the resulting summed vector is normalized 911 to produce normalized summary vector for the image 913. Normalization is performed by dividing each component in the vector by the absolute magnitude of the context vector. The magnitude of the context vector is determined by taking the square root of the square of all of the components in the context vector.

Of course, alternative training techniques may be used. More generalized context vector techniques are disclosed in Caid et al., the subject matter of which is incorporated herein by reference.

Summary Vector Storage (Clustering)

Figure 10:
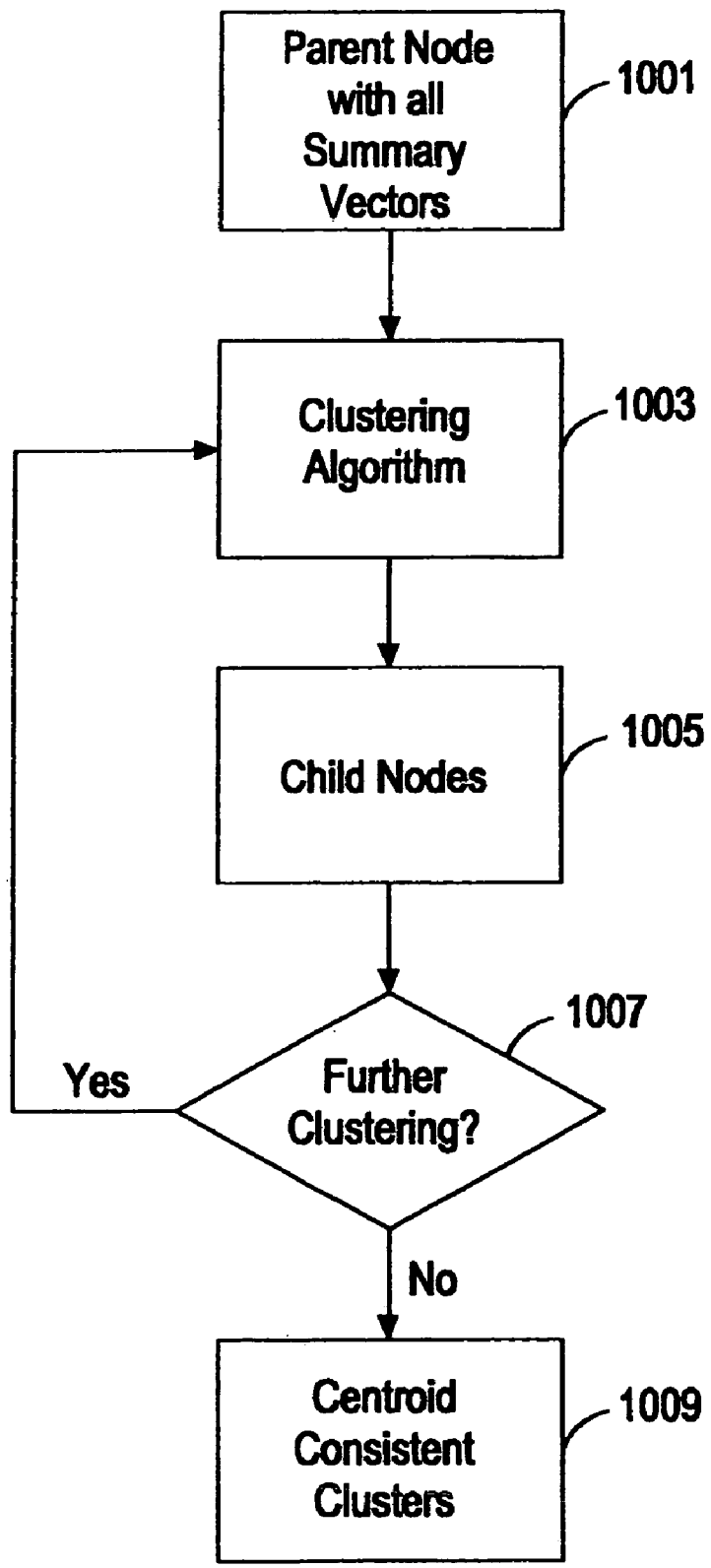
FIG. 10 is a high level flowchart of the clustering method of the present invention.

Once the summary vectors 913 have been determined, they are stored in storage 104. As in Caid et al., summary vectors 913 can be stored to further reduce searching time by creating cluster trees. Referring to FIG. 10, an initial parent node 1001 at the top of a tree indexed as level 0, node 1, contains all of the summary vectors 913 for all images 201 in the image database 106. A series of child nodes 1005, each branching from the initial parent node 1001, are created at a next level of the cluster tree by employing clustering algorithm 1003. For each child node 1005, further branching can be made by treating the child as the parent in clustering algorithm 1003. This process can be repeated until a sufficient level of clustering detail is achieved 1007, the result being centroid consistent clusters 1009.

Figure 11:
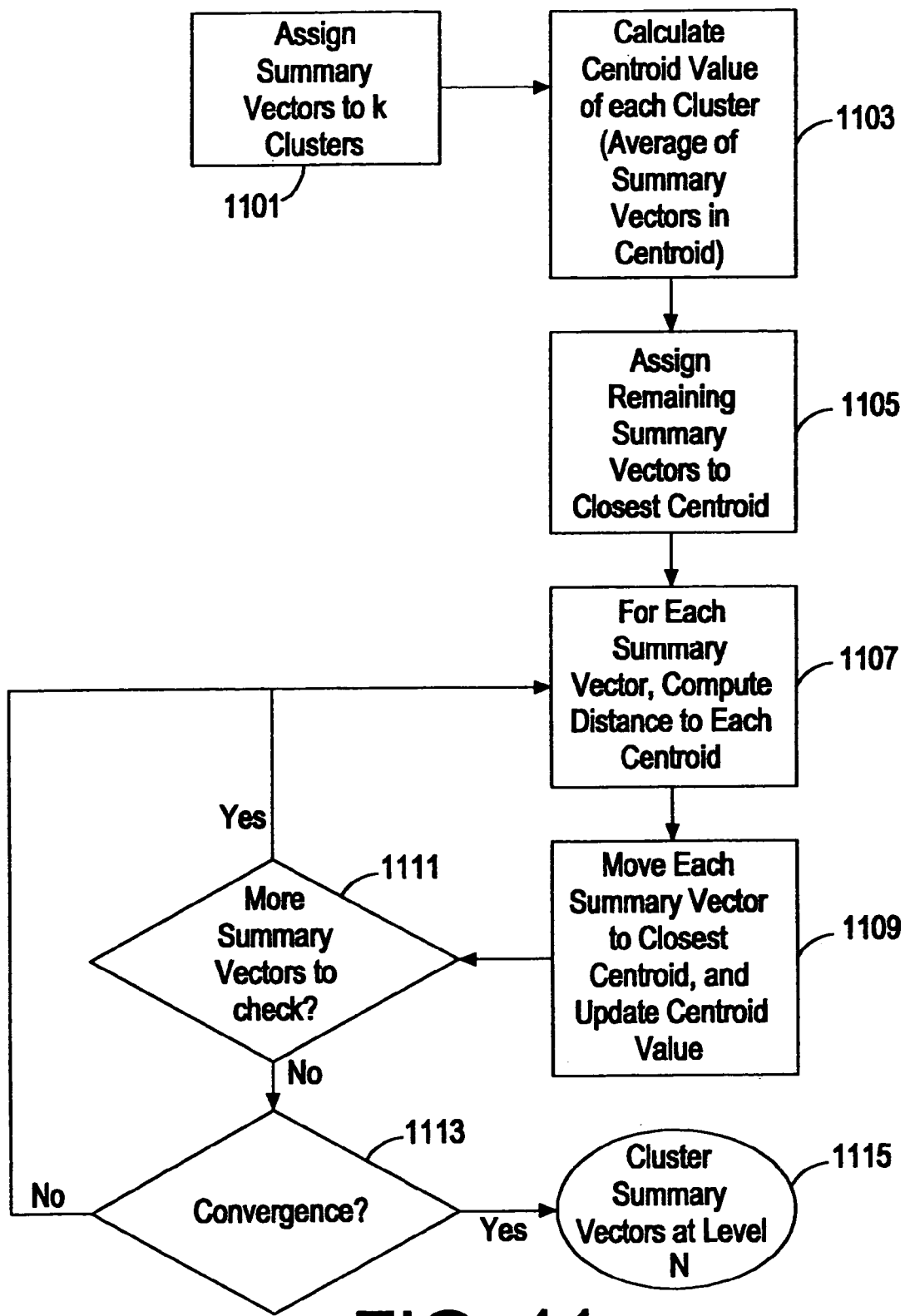
FIG. 11 is a flowchart of one embodiment of the clustering method.

FIG. 11, further details a flowchart of clustering algorithm 1003. Centroid-consistent clustering algorithm 1003 divides parent summary vectors 1001 among a series of children nodes 1005. A group of clusters is centroid-consistent if every member of every duster belongs to the cluster in the group with the closest centroid. A centroid is determined by taking, for each dimension, an average of the component values from all of the summary vectors within the group. In a preferred embodiment, the convergent k-means clustering algorithm, a well known clustering algorithm, is used. Convergent k-means clustering can be performed as follows:

1. Begin with any initial partition that groups the vectors into k clusters 1101. For example, take the first k summary vectors as single element clusters and set the initial value of the centroid of each cluster to equal its member vector 1103. Assign each of the remaining summary vectors to the cluster having the nearest centroid (computed by dot product with each cluster) and recompute the centroid for the cluster which gains a vector 1105;

2. Take each summary vector in sequence and compute its distance from the centroid of each of the k-clusters 1107 (computed by dot product).

If the vector is not currently in the cluster with the closest centroid, move the vector to that cluster and update the centroids of the clusters that gain or lose a summary vector 1109. This step is performed for each summary vector 1111; and 3. Repeat step 2 until convergence is achieved, that is until a pass through all of the summary vectors causes no new assignments 1113. Thus, centroid consistent clusters at a new level are created 1115.

Since convergence 1113 may be rather time-consuming to achieve, the clustering algorithm can be simplified by limiting the number of repetitions of step 2 (1107, 1109, 1111). After a given number of repetitions, such as 99, the centroids can be frozen. Then, one or more passes can be made through all of the summary vectors, distributing the vectors to appropriate clusters, but without updating the centroids. The centroids approximated in this manner will no longer be exact centroids, but such approximate centroids may be sufficient for most applications of the present invention. It is not necessary that the centroids be precise according to the present invention; however, it is preferable that the dusters be centroid-consistent with the approximate centroids. "Centroids" as used hereinafter in this application shall mean approximate centroids—In other words, a centroid sufficient to establish centroid-consistent clusters. Each node is identified by its centroid for use in the searching process.

In forming a next level of clusters 1007, the nodes in the level above become parent nodes to as set of child nodes below. Only the summary vectors assigned to a parent node are used in the clustering algorithm to form a the child nodes which branch from that parent. This is repeated across the entire level of parent nodes and on subsequent levels so that fewer and fewer context vectors are assigned to the child nodes on each lower level.

The nodes form a tree pattern in which each node branches from a node in the level above. Thus, each summary vector is assigned to a node on each level of the cluster tree. Each node has a centroid. The bottom-level node assignments for each summary vector and the centroids for each node are stored for use in the search and retrieval algorithms. On the bottom level of the tree, each node points to each summary vector assigned to it. The nodes on the bottom level may be referred to as "buckets."

Once a cluster tree has been set up 1009, it is a simple matter to add a new record summary vector to the tree. The initial branches of the tree are examined to find the closest centroid. The summary vector is assigned to the node with the closest centroid. Then, the branches from that node are examined for the closest child node centroid, and the process is continued until a bucket is reached. The new record is then assigned to the bucket with the closest centroid of those buckets branching from the node on the previous level to which the summary vector was assigned. The centroids are not changed. This action preserves centroid-consistency of the clusters. If a bucket gets too large, the summary vectors on the bucket can be divided into subclusters on a subsequent level.

Summary Vector Indexing

Images can also be indexed to terms. Index terms can be textual words or codes, for example. More than one index term can be associated with an image. For example, an image of a dog may be indexed to the textual words "dog", "bark", and "pet". Thus, an index to textual terms allows for searching of images using textual retrieval techniques. The underlying principle is that images that have similar content will be associated with similar index terms. Index terms can also be associated with atoms or sets of atoms. The basic indexing algorithm as it relates to text is also described in Caid et al.

Figure 12:
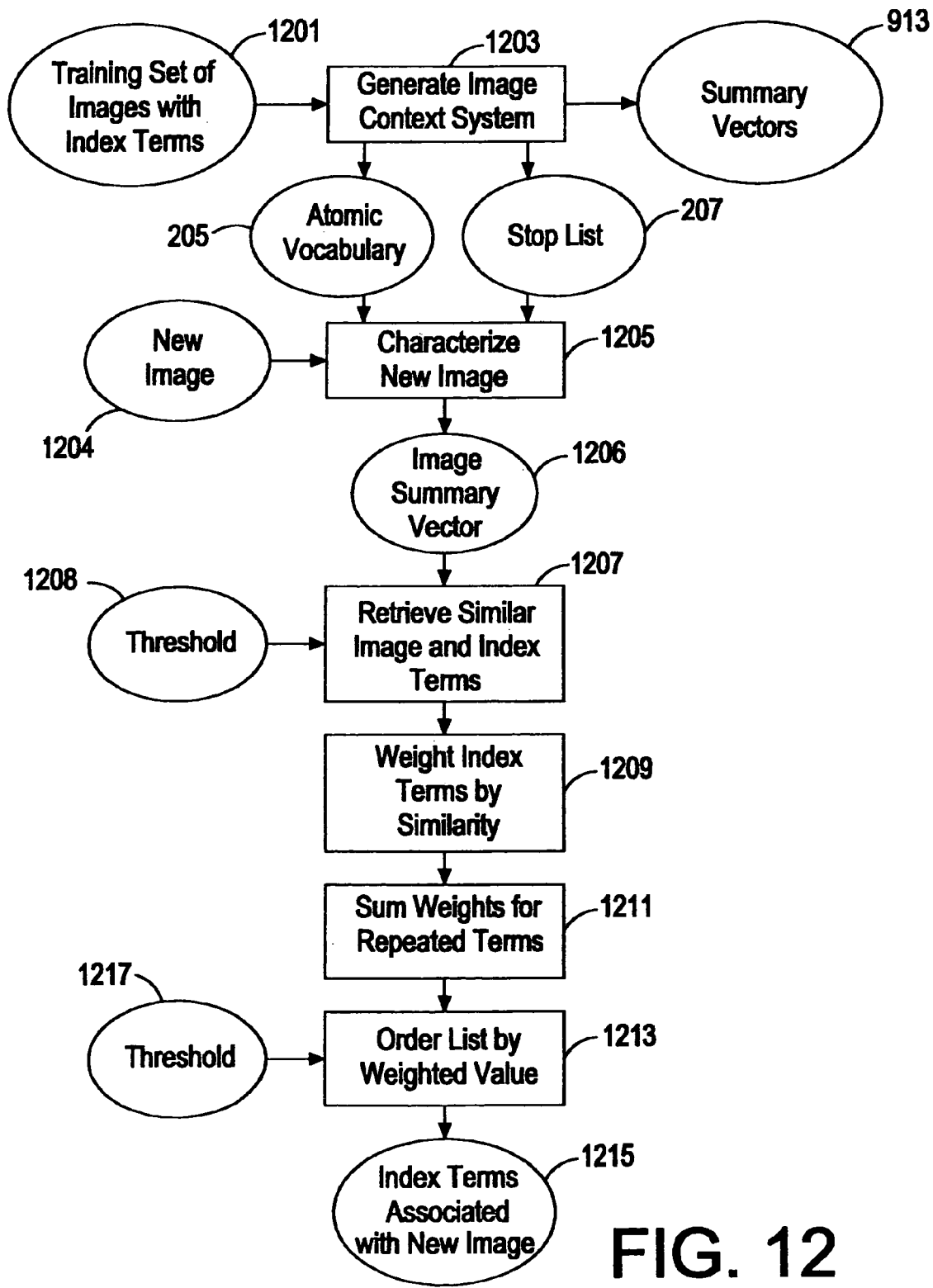
FIG. 12 is a high-level flowchart of one embodiment of the indexing method.

Referring now to FIG. 12, a high level data flow diagram of image indexing is shown. First, a set of pre-indexed "training images" is constructed, i.e., associated index terms are determined for each image 1201. The index term/image association is generally derived by humans according to experience. One or more index terms may be associated with each image. An image context system is built according to the invention as described above 1203, i.e., an atomic vocabulary 205 with stop list 207 is constructed, bootstrapping is performed, and summary vectors 913 are generated for each image.

A new image 1204 is characterized 1205 using the existing atomic vocabulary 205 and stop list 207 as described above, i.e., wavelet transformation and mapping to closest atoms in atomic vocabulary, and a summary vector 1206 for the image is generated. Similar images, and their associated index terms, in the existing training corpus are retrieved by calculating a dot product between the new image summary vector 1206 and each summary vectors 913 associated with the images in the training corpus 1207. Optionally, a threshold can be set to retain the best matches, e.g., the top ten similar images and associated index terms 1208. The associated index terms retrieved are weighted by both similarity 1209 and frequency of occurrence 1211 and an ordered list is produced of the most relevant index terms 1213. The new image is then associated with the listed order of index terms 1215. A threshold 1217 can also be used to choose the top N index terms from the weighted list.

Retrieval

Figure 13:
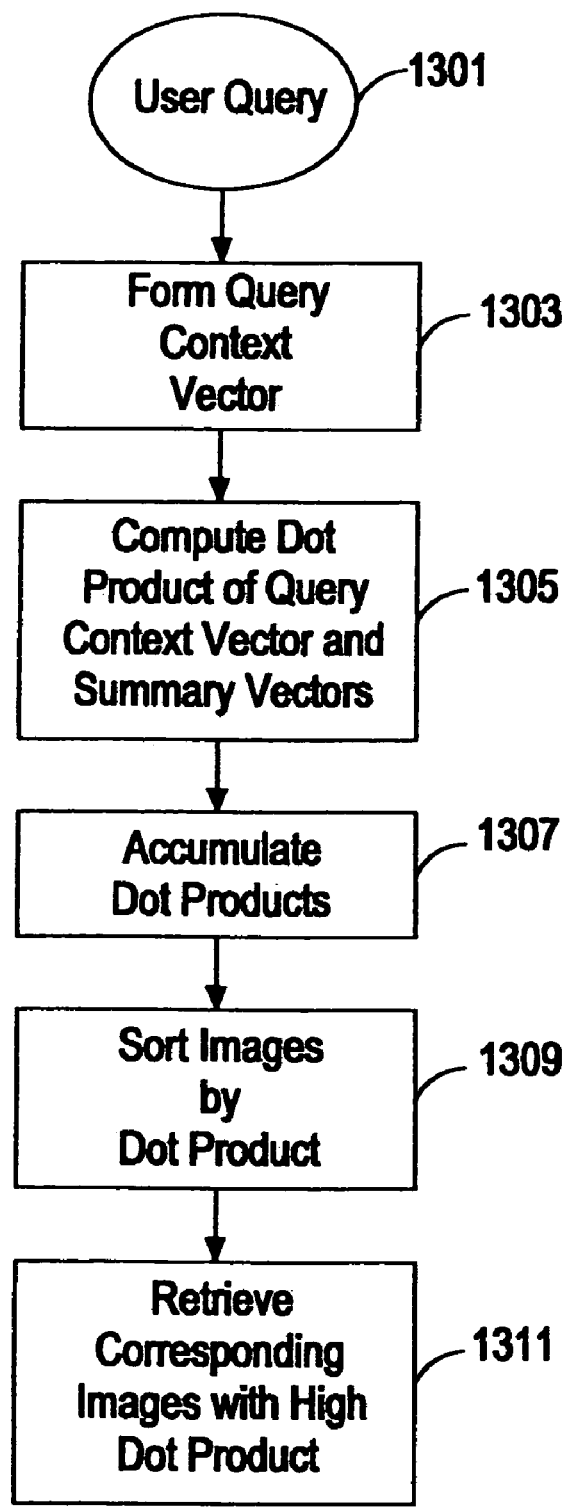
FIG. 13 is a flowchart of one embodiment of the retrieval method.

Referring now to FIG. 13, there is shown a flowchart of the retrieval method of the present invention. The system allows the user to formulate image queries using several approaches. For example:

Image Queries: Whole images can be used as queries. This is, in essence, asking the system to retrieve images that "look like" a particular image. For this query mode, a summary vector for the query image is generated (i.e., using the atomic vocabulary 205, 311) and is used as the query context vector.

Atomic Queries: The user can use a mouse or other computer input device to select portions of a displayed image to be used as a query. The system determines the atoms contained in the designated portions of the displayed image and forms a query context vector using the atomic vocabulary 205, 311. The query context vector is computed from a weighted sum of context vectors of the atoms in the portion of the displayed image being used as the query.

Textual Searches: As described above textual index terms or codes can be associated with images or atoms. For example, the context vector for the word stem "aircraft" could be aligned with a visual representation of an aircraft. Thus, text-based queries could be used in retrieval of image data.

Boolean Matches: The user may specifically identify atomic vocabulary codes to be matched by the search using boolean logic (e.g., and, or, not operators). Boolean logic may also be combined with, for example, the image query technique.

Regardless of the approach used, user queries 1301 are converted into a query context vector 1303. For example, images and image portions are represented by the atomic vocabulary vectors 205 and a weighted query vector is formed from the atomic vocabulary vectors (see FIG. 5). Image relevance is assessed by computing the dot product 1305 of each image summary vector 913 with the query context vector 1303, and accumulating the results 1307. The images are sorted by dot product 1309. Images associated with the summary vectors that produced high dot products are retrieved 1311.

If desired, image summary vectors may be organized in cluster trees for quicker searching. By using the above-described cluster tree storage mechanism (FIGS. 10 and 11), the searching task can be greatly accelerated. The query vector is used to identify the centroid that is closest to the query vector (by dot product computation). The search is performed using a depth first tree walk. A branch is followed down the tree, taking the node at each level having the centroid closest to the query vector. The search proceeds down the tree until a bottom level node without children, e.g., a bucket, is reached. Each of the summary vectors in the bucket is compared with the query vector (again by dot product computation) to identify the closest summary vectors).

The system may also employ relevance feedback, whereby the user specifies which of the retrieved images are most helpful. A new search may then be performed using the summary vector for the specified images. This technique reduces the time required for searches and improves system effectiveness.

Figure 14:
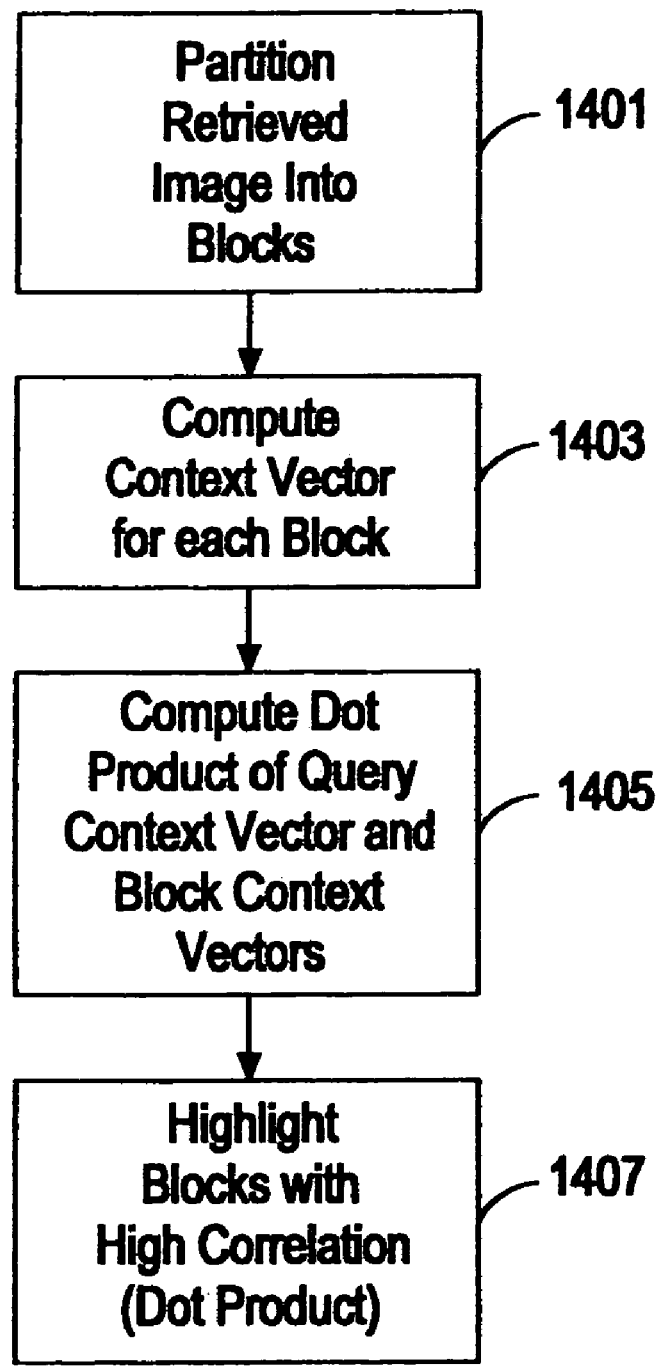
FIG. 14 is a flowchart of one embodiment of the highlighting method.
Figure 15:
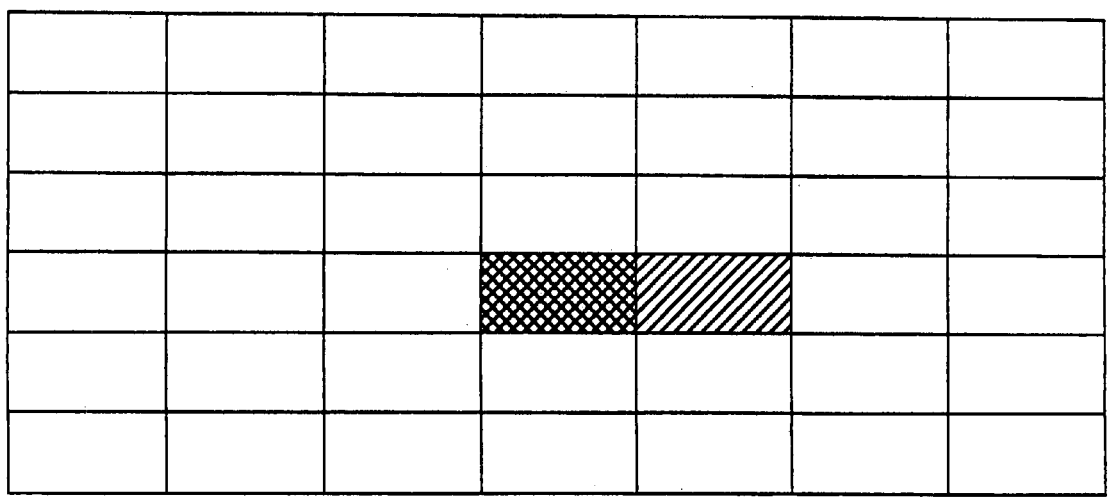
FIG. 15 is a pictorial representation of highlighting as used in the present invention.

Referring to FIG. 14, highlighting of retrieved images may also be provided. Highlighting indicates image portions having high correspondence to the query vector. To perform highlighting, the retrieved image is partitioned into blocks 1401. A context vector is computed for each block 1403, and the dot product of the query context vector 1303 and each block context vector is computed 1405. The block 1401 with the highest dot product has the highest degree of correlation with the query 1303, and is indicated by some visual distinction such as color, inverse video, or some other form of identification 1407. The highlighting concept is pictorially shown in FIG. 15.

Also, as described in Caid et al. (and incorporated herein), summary vectors of images can be visually displayed for navigation through the corpus of images to find images that are of interest. Essentially, the summary vectors for images and other information items are displayed in a pseudo-orthogonal display having axes corresponding to query terms (the query terms need not actually be orthogonal to one another). In this application query terms may be atomic vocabulary items, for example. Image summary vectors may also be displayed with visual attributes representing relative similarity of meaning with query terms, e.g., color, shape, orientation, texture.

Additional Applications

Practical applications of the present image storage and retrieval method and system are numerous. For example, the system and method can be used in medical imaging to find myopethis, tumors, or bone breaks in medical images and X-rays. Signature recognition of, for example, checks, or other valid signatures can be performed using images of such signatures in image database 106.

As noted above, image database 106 can comprise video or temporally related images. Thus, video data can be used in the present invention. For example, films can be input into the system frame by frame (or using lower sampling frequencies, e.g., every 5th frame). Thus, films or portions thereof can be compared.

As disclosed in Caid et al. (and incorporated herein), the use of context vectors to represent data from several different data domains in a common universal meaning space is possible (see Appendix A of Caid et al.). In the textual application of context vectors, different languages are linked together by word-pairs or "tie" words that have the same meaning in both languages (e.g., water and wasser in English and German, respectively). The context vector of the tie word in English is used as the context vector of the word in the foreign language. Training of the context vectors in foreign language proceeds normally, except for the fixed context vector associated with the tie words. Context vectors in the foreign language that are close (e.g., dot product) to the tie word context vector will be similar in meaning to the English tie word. Thus, English queries can be used to retrieve foreign works. The joinder of foreign language data domains represents a common "universal meaning space."

Similarly, a common universal meaning space can be constructed for images (or video) and sound, for example. Certain "ties" can be fixed between images (e.g. a St. Bernard dog) and audio clips ("bark") (context vectors in the audio domain may be, for example, frequency and/or amplitude measurements). Training of the context vectors in each domain proceeds normally except for the fixed ties. Thus, a picture of a Chihuahua dog, would be highly linked to the sound clip "bark" by virtue of being close in meaning (i.e., summary vector dot product) to the St. Bernard dog image. Thus, audio and video data domains can be linked in a common or universal meaning space.

Similarly, text and images can be linked, for example magazines and pictures in magazines. Here, the text surrounding the image (e.g., in a caption) can be automatically "tied" or associated with the image. The strength of the tie association can also be varied according to spatial proximity of the text to the image, boldness, font, or other factors. See Caid et al. for an application of context vectors to text.

Information elements in the textual application may be, for example, words or word stems (root words).

The above description is included to illustrate the operation to the preferred embodiments and is not meant to limit the scope of the invention. The scope of the invention is limited only by the following claims. From the above discussion, many variations will be apparent to one skilled in the art that are yet encompassed by the spirit and scope of the invention.

The invention claimed is:

1. A computer-implemented method for training context vectors for objects within documents, comprising the steps of:
   for each of a plurality of objects, generating a plurality of feature vectors from object data of the object;
   for each object, associating each of the object's feature vectors with a context vector;
   for each object, aligning each of the context vectors of the object using a context vector of at least one word included in a document containing the object; and
   aligning each of the context vectors of the object by adjusting the object context vector to be more similar to the summary vector of the at least one word included in the document containing the image.

2. The method of claim 1, wherein the object is any of: text, image, image data, and one or more image features.

3. The method of claim 1, wherein the step of associating each of the object's feature vectors with a context vector further comprises the step of:
   initializing the context vectors to be substantially orthogonal to each other.

4. The method of claim 1, wherein the context vectors are oriented in a vector space, and wherein axes of the vector space not associated with selected objects or object features.

5. A computer-implemented method for training context vectors for objects within documents, comprising the steps of:
   providing a plurality of word context vectors, each context vector having an orientation in a vector space, wherein words having similar meaning have context vectors with similar orientations in the vector space;
   providing a plurality of object context vectors, each object context vector associated with a feature vector, each feature vector derived from object data of at least one object, each object context vector having an orientation in the vector space;
   for each document containing an object, aligning the object context vectors associated with the feature vectors derived from the object, with a summary vector derived from context vectors of selected words contained in the document; and
   wherein aligning the object context vectors with a summary vector derived from context vectors of selected words contained in the document by adjusting the object context vector to be more similar to the summary vector of the selected words included in the document.

6. The method of claim 5, wherein the object is any of: text, image, image data, and one or more image features.

7. The method of claim 5, wherein the context vectors are oriented in the vector space, and wherein axes of the vector space not associated with selected terms or image features.

8. A computer-implemented method for retrieving records having different object types, the method comprising:
   providing a plurality of first records, each first record having a first object type;
   for each of the first record having the first object type, deriving from elements of the first record a context vector, the context vector having an orientation in a vector space;
   providing a plurality of second records, each second record having a second object type;
   for each of the second records having the second object type, deriving from elements of the second record a context vector, the context vector having an orientation in the vector space;
   receiving a query, comprising at least one element of the first object type;
   deriving a query context vector from the query; and
   retrieving at least one second record having a context vector similar to the query context vector.

9. The computer-implemented method of claim 8, wherein the object is any of a first media type and a second media type.

* * * * *

UNITED STATES PATENT AND TRADEMARK OFFICE
CERTIFICATE OF CORRECTION

| | | |
|---|---|---|
| PATENT NO. | : 7,072,872 B2 | Page 1 of 1 |
| APPLICATION NO. | : 10/868538 | |
| DATED | : July 04, 2006 | |
| INVENTOR(S) | : Caid et al. | |

It is certified that error appears in the above-identified patent and that said Letters Patent is hereby corrected as shown below:

On the title page item (75) Inventors:, replace "William R. Caid, San Diego; Robert Hecht-Neilsen, Del Mar, both of CA (US)"

with - - William R. Caid, San Diego; Robert Hecht-Nielsen, Del Mar, both of CA (US)- -.

Signed and Sealed this

Twelfth Day of September, 2006

JON W. DUDAS
*Director of the United States Patent and Trademark Office*